Oct. 4, 1932.  T. ELLIOTT  1,880,934
HULL EXTRACTOR
Filed April 8, 1930
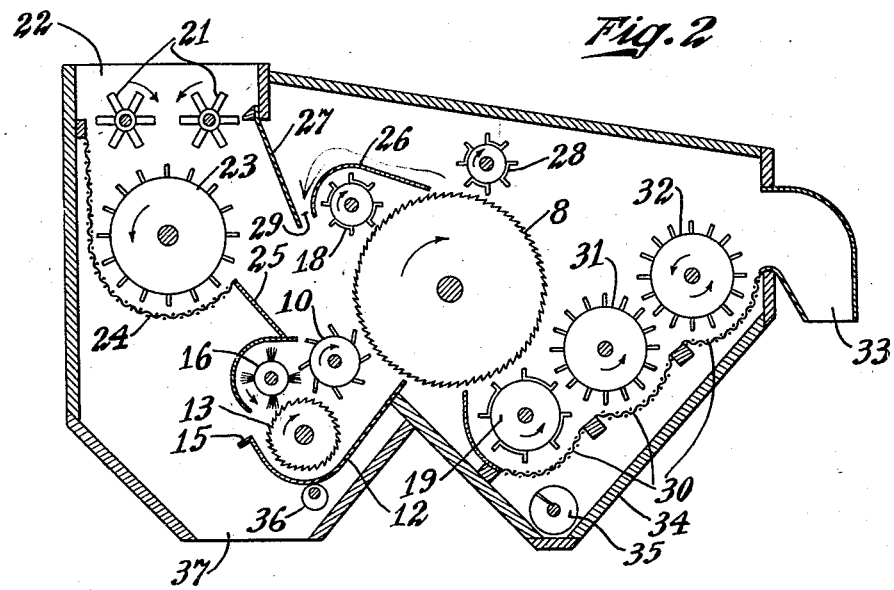
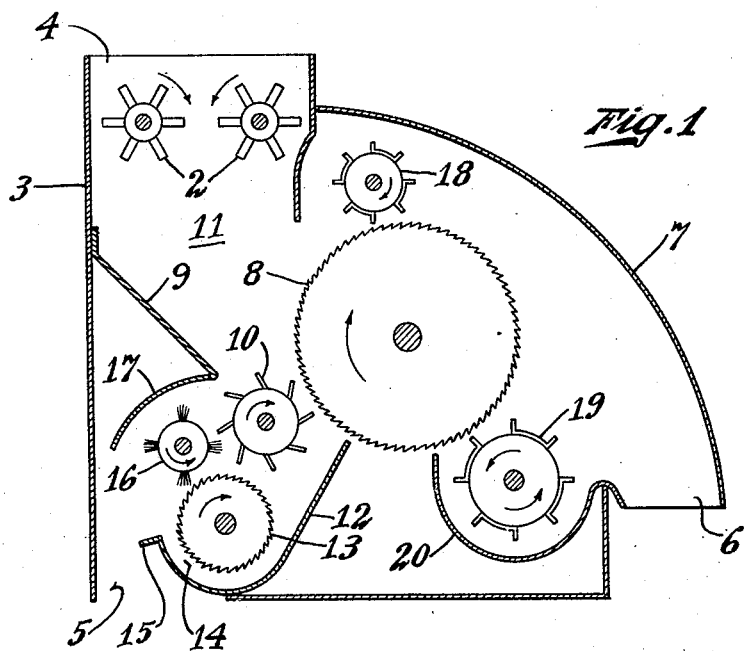
INVENTOR
*Thomas Elliott*
BY
*Johnston & Jennings*
ATTORNEYS
WITNESS
*Charles H. Bassett*

Patented Oct. 4, 1932

1,880,934

UNITED STATES PATENT OFFICE

THOMAS ELLIOTT, OF BIRMINGHAM, ALABAMA, ASSIGNOR TO CONTINENTAL GIN COMPANY, A CORPORATION OF DELAWARE

HULL EXTRACTOR

Application filed April 8, 1930. Serial No. 442,642.

This invention relates to hull extractors of the character suitable for the removal of hulls and trash from seed cotton preliminary to the ginning operation.

The problem to be solved in my present invention is the economical and efficient removal of hulls and trash from the seed cotton without the loss of any appreciable amount of cotton passing out with hulls.

My invention contemplates the employment of a treatment casing containing a saw cylinder or like toothed element and associated with hull board means for directing the entering mass of cotton, hulls and trash into contact with the saw, which has suitable means for stripping the hulls from the cotton engaged by the saw and for doffing the cleaned seed cotton.

Machines of this character must make ample provision between the discharge end of the hull board means and the saw cylinder for the ready escape of hulls and trash so that the latter will not remain so long in the working chamber of the extractor that they are cut up by the saws, thereby filling the seed cotton with shale and hull particles which are very difficult to remove and which, unless removed, will reduce the grade and selling price of the cotton. On the other hand, if the opening for the escape of the hulls be large enough for the free escape of hulls, too much cotton will pass out with the hulls and this cotton must be efficiently and economically reclaimed or the apparatus will be inefficient.

In my present invention it is contemplated that ample clearance will be left between the hull board means and the saw cylinder and the hull board means can be made up of any element or groups of elements suitable to direct the entering mass of cotton into contact with the saw cylinder. Preferably, I use a hull board which delivers to a picker roller which is spaced from the saw cylinder to define the escape opening for the hulls.

My invention is particularly concerned with the means for reclaiming cotton that escapes with the hulls from the type of extractor above described and it is an important object to accomplish this recovery by the use of a minimum number of moving parts and by the elimination of any parts subject to wear and constant replacement.

As a reclaiming means I propose to employ a reclaiming saw cylinder or equivalent toothed element associated with a guide means which will bring the cotton and hulls escaping from the treatment chamber into engagement wth this reclaiming saw cylinder, and the guide means is so designed and related to said reclaiming saw cylinder that it will cause the hulls to be lifted to discharge position by the up-going teeth of the reclaiming saw which is arranged to work upwardly through any hulls that accumulate on that side of it. Preferably the guide means is of a rigid nature such as a plate and is designed to permit the escape of hulls on the up-going side of the reclaiming saw cylinder which is preferably remote from the main saw cylinder. With this reclaiming saw is associated any suitable means for doffing the cotton, such means in the preferred construction being a doffer interposed in position to deliver the doffed reclaimed cotton to the picker roller which will return it into position to be acted upon by the main saw cylinder. Obviously, however, my invention contemplates any agency that is available for returning the reclaimed cotton to the main saw cylinder.

My invention further contemplates the provision of means by which a single main saw cylinder may be associated with a plurality of stripper rollers so arranged and disposed as to successively engage and knock back into the treatment chamber any hulls or trash tending to pass onto the gin with the seed cotton. Preferably the initial stripper roller is arranged in normal relation to the cotton entering the treatment chamber and the second stripper roller is disposed between the first stripper roller and the doffing means and is associated with suitable guides which will direct the hulls and trash detached by the second stripper roller back into the treatment chamber.

Preferably this double treatment hull extractor is associated with cleaning and cotton reclaiming agencies on the one side and with doffing and cleaning agencies on the other side.

My invention also comprises the novel details of construction and arrangements of parts, which in their preferred embodiment only are illustrated in the accompanying drawing, in which:—

Fig. 1 illustrates in vertical cross-sectional view, from which the drive means has been omitted, a hull extractor utilizing a single stripper roller.

Fig. 2 shows a similar view of a modified type of extractor utilizing a double stripper roller and a plurality of cleaning agencies.

Similar reference numerals refer to similar parts throughout the drawing.

In the embodiment of my invention illustrated in Fig. 1, I show an extractor casing comprising an end wall 3, a top inlet opening 4, a bottom having a hull opening 5 and a seed cotton outlet 6 with a cover 7 extending from the inlet 4 to the outlet 6.

The customary feed rolls 2 can be used, if desired, in the feed inlet, and the entering cotton, hulls and trash are directed to the main saw cylinder 8 by any suitable hull board means, that illustrated comprising the inclined board 9 which terminates short of and in spaced relation to the teeth of a picker roller 10 disposed to deliver the cotton and hulls from board 9 to the teeth of the saw 8 and yet arranged in such relation to the saw as to permit the escape of hulls from the treatment chamber 11 only between this roller and the saw 8.

The hulls which thus escape, together with any loose cotton, are directed by means of a guide wall 12 into engagement with the teeth of a reclaiming saw or toothed cylinder 13. In the preferred arrangement, this cylinder 13 rotates in the same direction as the main saw cylinder 8 and the guide board 12 extends under the saw cylinder 13 and rises beyond sufficiently to cause the hulls and trash to be lifted through the space 14 lying between the free edge 15 of the guide and the saw cylinder 8. Any suitable doffing means, such as the brush 16 coacts with the reclaiming saws 13 and acts to direct the doffed cotton into engagement with the teeth of the picker roller 10 which return it to the treatment chamber and to the main saws 8. A suitable guard plate 17 is provided for the doffing brush 16.

The hulls passing over the edge 15 escape through the discharge 5. The hulls carried around by the saws 8 with the cotton are stripped by the roller 18 and returned to the treatment chamber 11. The cotton is doffed from the main saw cylinder 8 by a doffer 19 and delivered to the discharge 6 whence it passes to the gin or subsequent treatment apparatus. The doffer 19 has associated with it the usual concave guard 20 extending from the opening 6 to a point adjacent to the saw cylinder 8.

The apparatus as thus described will function as follows: The entering seed cotton, hulls and trash are directed into engagement with the saw cylinder 8 which carries them upwardly, the stripper roller 18 knocking the hulls carried over with the cotton back into the treatment chamber 11 while the cotton passes on to be doffed by the doffer 19. The hulls, together with a small amount of adhering cotton and loose cotton locks, will fall through the space between the picker roller 10 and saw cylinder 8 and the direction of rotation of the picker teeth will prevent the hulls tending to clog or choke this escape opening. As the hulls with occasional accompanying locks of cotton escape, they are directed by the guide 12 into engagement with the teeth of the reclaiming saws 13 which sweep them around towards the space 14. Here the teeth of the reclaiming saws must lift or eject the hulls against the force of gravity and/or the resistance set up by the hulls tending to accumulate in this space 14, and the speed of rotation of the up-going saw teeth 13 should be reduced so that they will not eject the hulls until freed of cotton. It follows that the reclaiming saws must act to raise the hulls through the space 14 in order to discharge them over edge 15 to the hull outlet.

As the saws work through this space 14 they act on hulls that are free and thus they will without unduly cutting the hulls, engage and remove practically all of the cotton that escapes between the picker roller 10 and the main saws 8. The cotton thus reclaimed is doffed by the brush 16 and delivered to the main saws 8 preferably by being passed directly to the picker roller 10 and thence passed through the treatment chamber back into engagement with the main saws.

Referring now to Fig. 2, the feed rolls 21 receiving the cotton and hulls through the feed inlet 22 will deliver the same to a cleaning roller 23 working over a screen concave 24, which terminates in an inclined hull board 25 that delivers the seed cotton and hulls to a picker roller 10, which in turn delivers same into engagement with the main saws 8. The stripper roller 18 coacts with the main saws in the manner described but is guarded overhead by a plate 26 which at its left hand end is in spaced relation to a guard plate 27 and at its right hand end terminates very close to the top of the main saw cylinder 8. Beyond this guard 26 is arranged a second stripper roller 28 disposed so that any hulls and trash not removed by the roller 18 will be removed by this stripper roller and knocked over the guard 26 so that it will pass back into the treatment chamber through an opening 29. The doffer 19 in this design works over one of a series of screen concaves 30 arranged at an incline and its direction of rotation is such as to cause the cotton doffed by it to be passed successively under the cleaning rolls 31 and 32 and to be finally delivered to the cotton outlet 33. A hopper 34 collects the dirt and trash falling through the screen concaves 30 and delivers same to a conveyor 35.

The hulls are treated by a cotton reclaiming apparatus exactly as described in connection with Fig. 1, except that in this instance an adjusting eccentric 36 is provided below the guide board 12 which is sufficiently flexible to be adjusted towards and from the reclaiming saws 13, thereby to regulate not only the working clearance between the guide and said saws but also the height of the edge 15 and therefore to regulate the distance that hulls must be moved by the reclaiming saws to escape to the discharge 37.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. A cotton cleaning machine, comprising a main saw cylinder, guide means to direct the material to be treated into contact with said cylinder, stripping and doffing means coacting with said cylinder, a cotton reclaiming rotatable member with which hulls and cotton are engaged that escape between the said cylinder and guide means, a hull guide so disposed that hulls are driven upwardly over same to the discharge by the action of said reclaiming member, and agencies to doff from said reclaiming member the cotton reclaimed thereby from among the hulls.

2. In a cotton cleaning machine, the combination with a main saw cylinder, means to guide cotton and hulls into contact therewith, and means to strip and doff said cylinder, of a cotton reclaiming means disposed to receive hulls and any cotton escaping between said guide means and the main saw cylinder and comprising a rotatable cotton reclaiming element having teeth adapted to engage the hulls and strip the cotton therefrom, means to doff reclaimed cotton from said element, and a hull guide over which the up-going teeth of said element eject the cleaned hulls to freely discharge them.

3. In a cotton cleaning machine, the combination with a main saw cylinder, means to guide cotton and hulls into contact therewith, and means to strip and doff said cylinder, of a cotton reclaiming means disposed to receive hulls and any cotton escaping between said guide means and the main saw cylinder and comprising a rotatable cotton reclaiming element having teeth adapted to engage the hulls and strip the cotton therefrom, means to doff reclaimed cotton from said element, and a hull guide adapted to deliver the hulls to the up-going side of said reclaiming element and having a raised edge over which the hulls are freely ejected responsive to their engagement with the up-going teeth of said element.

4. In a cotton cleaning machine, the combination with a main saw cylinder, means to guide cotton and hulls into contact therewith, and means to strip and doff said cylinder, of a cotton reclaiming means disposed to receive hulls and any cotton escaping between said guide means and the main saw cylinder and comprising a rotatable cotton reclaiming element having teeth adapted to engage the hulls and strip the cotton therefrom, means to doff reclaimed cotton from said element, and a hull guide plate adapted to guide the hulls under said reclaiming element and into engagement with its up-going side, the said plate having an unobstructed edge over which hulls upwardly driven by the action of said element may freely escape.

5. In a cotton cleaning machine, the combination with a main saw cylinder, means to guide cotton and hulls into contact therewith, and means to strip and doff said cylinder, of a cotton reclaiming means disposed to receive hulls and any cotton escaping between said guide means and the main saw cylinder and comprising a rotatable cotton reclaiming element having teeth adapted to engage the hulls and strip the cotton therefrom, a reclaiming saw cylinder, a hull guide means adapted to deliver the hulls into engagement with the up-going side of said latter saw cylinder and to provide an unobstructed avenue of escape for hulls driven upwardly therethrough by the teeth of the reclaiming saw cylinder, and means to doff said reclaiming saw cylinder.

6. A hull extractor for seed cotton, comprising a main saw cylinder having stripping and doffing means, a guide means to direct cotton and hulls into engagement with said cylinder and to permit hulls with some cotton to escape freely between said guide means and cylinder, a cotton reclaiming saw cylinder rotatable in the same direction as the main saw cylinder, a hull guide plate adapted to direct the escaping hulls and cotton into contact with the reclaiming saw cylinder, said plate extending under said latter cylinder and presenting an unobstructed raised hull discharge edge that stands in spaced relation to the up-going side of said reclaiming saw cylinder, and means to doff said latter cylinder.

7. A hull extractor for seed cotton, comprising a main saw cylinder having stripping and doffing means, a guide means to direct cotton and hulls into engagement with said cylinder and to permit hulls with some cotton to escape freely between said guide means and cylinder, a cotton reclaiming saw cylinder rotatable in the same direction as the main saw cylinder, a hull plate adapted to receive the escaping hulls and cotton on the down-going side and permit the free discharge of the hulls on the up-going side of said reclaiming saw cylinder by the action thereon of its saw teeth, and means to doff said reclaiming saw cylinder.

8. A hull extractor for seed cotton, comprising a main saw cylinder having stripping and doffing means, a guide means comprising a picker roller adapted to direct cotton and hulls into engagement with said cylinder and to permit hulls with some cotton to escape freely between said picker roller and cylinder, a cotton reclaiming saw cylinder rotatable in the same direction as the main saw cylinder, a hull guide plate adapted to receive the escaping hulls and cotton on the down-going side and permit the free discharge of the hulls on the up-going side of said reclaiming saw cylinder by the action thereon of its saw teeth, and means to doff said reclaiming saw cylinder and deliver the reclaimed cotton to said picker roller.

9. A hull extractor and cleaner for cotton comprising a main saw cylinder, a hull board means therefor, a cotton reclaiming means adapted to act on hulls and cotton escaping between said means and cylinder and to return the cotton reclaimed to said cylinder, a plurality of stripper rollers adapted to co-act successively with said cylinder, a guide to direct material, stripped by the second stripper roller, into position to again engage said cylinder in advance of said first stripper roller, and means to doff said cylinder.

10. A hull extractor and cleaner comprising a saw cylinder, a treatment chamber which directs cotton and hulls into engagement with said cylinder therein, means to reclaim cotton escaping with hulls from said chamber, two stripper rollers disposed to co-act successively with said cylinder, a guard extending over the roller, first to act on the cotton on said cylinder and adapted to return material stripped by the second stripper roller to said chamber, and means to doff said cylinder.

11. The combination with means for separating hulls, trash and the like from cotton, of means to reclaim cotton from the separated hulls, comprising a rotatable toothed element, and a guard for the hulls that are engaged by said element on its up-going side, there being provided an unobstructed avenue of escape for such hulls from confinement by said guard through which they are free to pass upwardly and be discharged responsive to engagement with said element, and means to doff reclaimed cotton from said element.

In testimony whereof I affix my signature.

THOMAS ELLIOTT.